US 12,211,285 B2

(12) United States Patent
Kuwahara (10) Patent No.: US 12,211,285 B2
(45) Date of Patent: Jan. 28, 2025

(54) OBJECT DETECTION SYSTEM AND OBJECT DETECTION METHOD (71) Applicant: Mitsubishi Electric Corporation, Tokyo (JP)

(72) Inventor: Eri Kuwahara, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 644 days.

(21) Appl. No.: 17/426,701

(22) PCT Filed: May 31, 2019

(86) PCT No.: PCT/JP2019/021696
§ 371 (c)(1),
(2) Date: Jul. 29, 2021

(87) PCT Pub. No.: WO2020/240813
PCT Pub. Date: Dec. 3, 2020

(65) Prior Publication Data
US 2022/0101634 A1    Mar. 31, 2022

(51) Int. Cl.
*G06V 20/58* (2022.01)
*G01S 13/931* (2020.01)
(Continued)

(52) U.S. Cl.
CPC .......... *G06V 20/58* (2022.01); *G01S 13/931* (2013.01); *G06V 10/72* (2022.01); *G06V 10/776* (2022.01)

(58) Field of Classification Search
CPC .... G01S 13/878; G01S 13/931; G01S 15/931; G01S 17/931; G01S 7/4004; G01S 7/497;
(Continued)

(56) References Cited

U.S. PATENT DOCUMENTS 3,646,506 A * 2/1972 Suter .................... G01S 15/523
367/97
4,047,172 A * 9/1977 Bauer .................... G01S 7/527
367/901

(Continued)

FOREIGN PATENT DOCUMENTS

DE  10 2014 223 432 A1   5/2016
JP     2003-030798 A    1/2003
(Continued)

OTHER PUBLICATIONS

International Search Report for PCT/JP2019/021696 dated Aug. 27, 2019 [PCT/ISA/210].
(Continued)

*Primary Examiner* — Tsung Yin Tsai
(74) *Attorney, Agent, or Firm* — Sughrue Mion, PLLC; Richard C. Turner (57) ABSTRACT

The present disclosure includes a multiple of object detection devices including a transmission system that transmits a transmission wave and a receiving system that receives a reflected wave from an object, and a control device into which detected information is input from each of the multiple of object detection devices, wherein the control device includes a representative value calculation unit that calculates a representative value of reception strength of the reflected wave obtained by each of the multiple of object detection devices detecting a peripheral object at regular intervals, and a performance decline determination unit that determines that a decline in performance of the multiple of object detection devices has occurred.

20 Claims, 5 Drawing Sheets

(51) Int. Cl.
  *G06V 10/72* (2022.01)
  *G06V 10/776* (2022.01)
(58) Field of Classification Search
  CPC . G01S 7/52004; G06F 2218/00; G06V 10/72; G06V 10/776; G06V 20/58
  See application file for complete search history.

(56) References Cited

U.S. PATENT DOCUMENTS

| | | | | |
|---|---|---|---|---|
| 2002/0044082 A1* | 4/2002 | Woodington | ......... | H01Q 13/10 |
| | | | | 342/128 |
| 2003/0016161 A1 | 1/2003 | Okai et al. | | |
| 2003/0210172 A1* | 11/2003 | Pleva | ..................... | H01Q 13/18 |
| | | | | 342/72 |
| 2004/0130481 A1 | 7/2004 | Okai et al. | | |
| 2004/0183712 A1* | 9/2004 | Levitan | ................. | G01S 13/872 |
| | | | | 342/52 |
| 2007/0006651 A1* | 1/2007 | Kruger | ................. | G01N 29/348 |
| | | | | 73/579 |
| 2009/0071255 A1 | 3/2009 | Okuda et al. | | |
| 2009/0079986 A1* | 3/2009 | Haag | ....................... | G01S 13/58 |
| | | | | 356/445 |
| 2013/0120184 A1* | 5/2013 | Aizawa | ................ | G01S 13/931 |
| | | | | 342/146 |
| 2016/0127664 A1* | 5/2016 | Bruder | ................... | A63F 13/25 |
| | | | | 356/614 |
| 2016/0252611 A1* | 9/2016 | Guecker | ................ | G01S 7/2955 |
| | | | | 342/70 |
| 2017/0108586 A1 | 4/2017 | Ueda et al. | | |
| 2017/0294127 A1* | 10/2017 | Nakatani | ................ | G01S 17/87 |
| 2019/0179016 A1* | 6/2019 | Raring | ................. | H01S 5/4087 |
| 2021/0096213 A1* | 4/2021 | Han | ........................ | G01S 13/52 |
| 2022/0101634 A1* | 3/2022 | Kuwahara | ............. | G06V 20/58 |
| 2022/0187451 A1* | 6/2022 | Hustava | ................. | G01S 7/527 |

FOREIGN PATENT DOCUMENTS

| | | |
|---|---|---|
| JP | 2008-309512 A | 12/2008 |
| JP | 2015-200563 A | 11/2015 |
| JP | 2016-166752 A | 9/2016 |

OTHER PUBLICATIONS

Office Action dated May 17, 2022 issued by the Japanese Patent Office in Japanese Application No. 2021-521722.
Office Action issued Apr. 27, 2024 in Chinese Application No. 201980095916.0.

* cited by examiner

OBJECT DETECTION SYSTEM AND OBJECT DETECTION METHOD

CROSS REFERENCE TO RELATED APPLICATIONS

This application is a National Stage of International Application No. PCT/JP2019/021696 filed May 31, 2019.

TECHNICAL FIELD

The present application relates to an object detection system and an object detection method.

BACKGROUND ART

To date, a radar device, which is one object detection device, has been such that in order to determine that a decline in performance has occurred, a decline in performance caused by a temporal change of the radar device, a temperature change, an adherence of dirt, or the like, is detected from a change in a level of a received signal when receiving a reflected wave from a target object detected while traveling, and a single radar device determines that a decline in performance in the device itself has occurred, as disclosed in, for example, Patent Literature 1.

CITATION LIST

Patent Literature

Patent Literature 1: JP-A-2003-30798

SUMMARY OF INVENTION

Technical Problem

A method whereby a single device determines that a decline in performance in the device itself has occurred, as is the case with the object detection device disclosed in Patent Literature 1, necessitates prior knowledge of a threshold for determining that a decline in performance has occurred. Further, when determining that a decline in performance has occurred based on a difference from the threshold, it is difficult, depending on the threshold setting, to determine whether the decline in performance is caused by dirt, or whether the decline in performance is caused by road conditions such as a mountain road or a snowy road.

The present application discloses technology for resolving the aforementioned kind of problem, and has an object of providing an object detection system and an object detection method such that it can easily be determined that a decline in performance has occurred using a multiple of object detection devices, regardless of the appropriateness of a threshold.

Solution to Problem

An object detection system disclosed in the present application is characterized by including a multiple of object detection devices including a transmission system that transmits a transmission wave and a receiving system that receives a reflected wave of the transmission wave, and a control device into which detected information from the multiple of object detection devices is input, wherein the control device includes a representative value calculation circuitry that calculates a representative value of reception strength of the reflected wave obtained by each of the multiple of object detection devices detecting an object in a periphery at regular intervals, and a performance decline determination circuitry that determines that a decline in performance of the multiple of object detection devices has occurred based on the calculated representative value.

Advantageous Effects of Invention

According to the object detection system disclosed in the present application, data obtained by a multiple of object detection devices are compared, because of which there is an advantage in that determination that a decline in performance has occurred is unlikely to be affected by the appropriateness of a threshold, and can be carried out easily.

DESCRIPTION OF EMBODIMENTS

Hereafter, preferred embodiments of an object detection system and an object detection method according to the present application will be described with reference to the drawings. Herein, embodiments wherein the object detection system is mounted in a vehicle will be described.

First Embodiment

Figure 1:
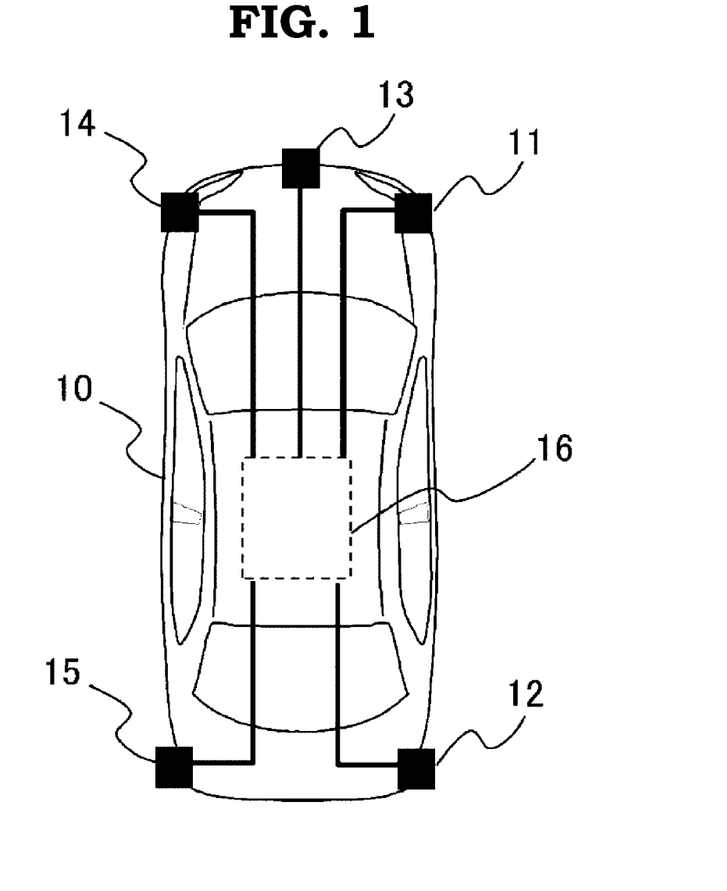
FIG. 1 is a plan view showing a vehicle in which an object detection system according to a first embodiment is mounted.

FIG. 1 is a plan view showing a vehicle in which an object detection system according to a first embodiment is mounted. In FIG. 1, five object detection devices, which are a first object detection device 11, a second object detection device 12, a third object detection device 13, a fourth object detection device 14, and a fifth object detection device 15, are mounted in a vehicle 10, and each object detection device includes a transmission system, which transmits a transmission wave, and a receiving system, which receives a wave that returns after being reflected by an object. Also, a control device 16 into which information detected by the five object detection devices from the first object detection device 11 to the fifth object detection device 15 is input is mounted in the vehicle 10. The number of object detection devices not being limited to five, it is sufficient that a multiple thereof are mounted.

Figure 2:
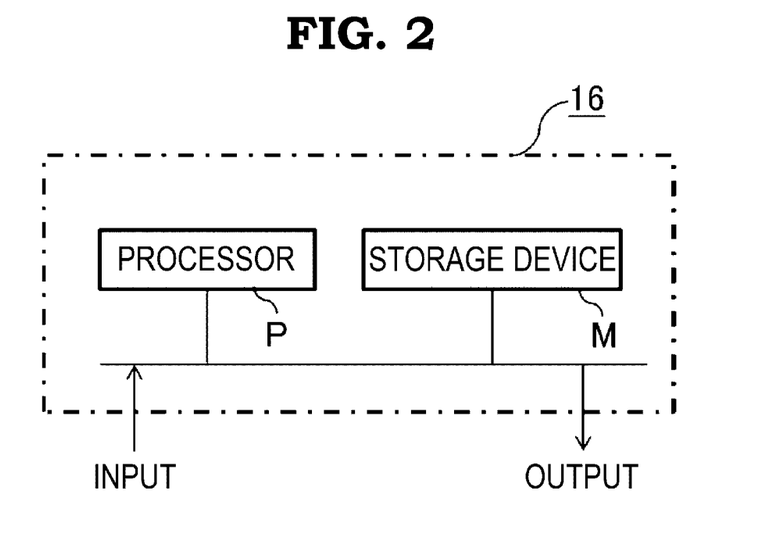
FIG. 2 is a drawing showing an example of hardware of a control device configuring the object detection system according to the first embodiment.

The control device 16 includes a representative value calculation unit and a performance decline determination unit, as will be described hereafter, and is configured of a processor P and a storage device M, as shown in a hardware example in FIG. 2. Although not shown, the storage device M is provided with a volatile storage device, such as a random access memory, and a non-volatile auxiliary storage device, such as a flash memory. Also, the storage device M may be provided with a hard disk auxiliary storage device instead of a flash memory. The processor P executes a program input from the storage device M. In this case, the program is input from the auxiliary storage device into the processor P via the volatile storage device. Also, the processor P may output data such as a computation result to the volatile storage device of the storage device M, or may save the data in the auxiliary storage device via the volatile storage device.

Figure 3:
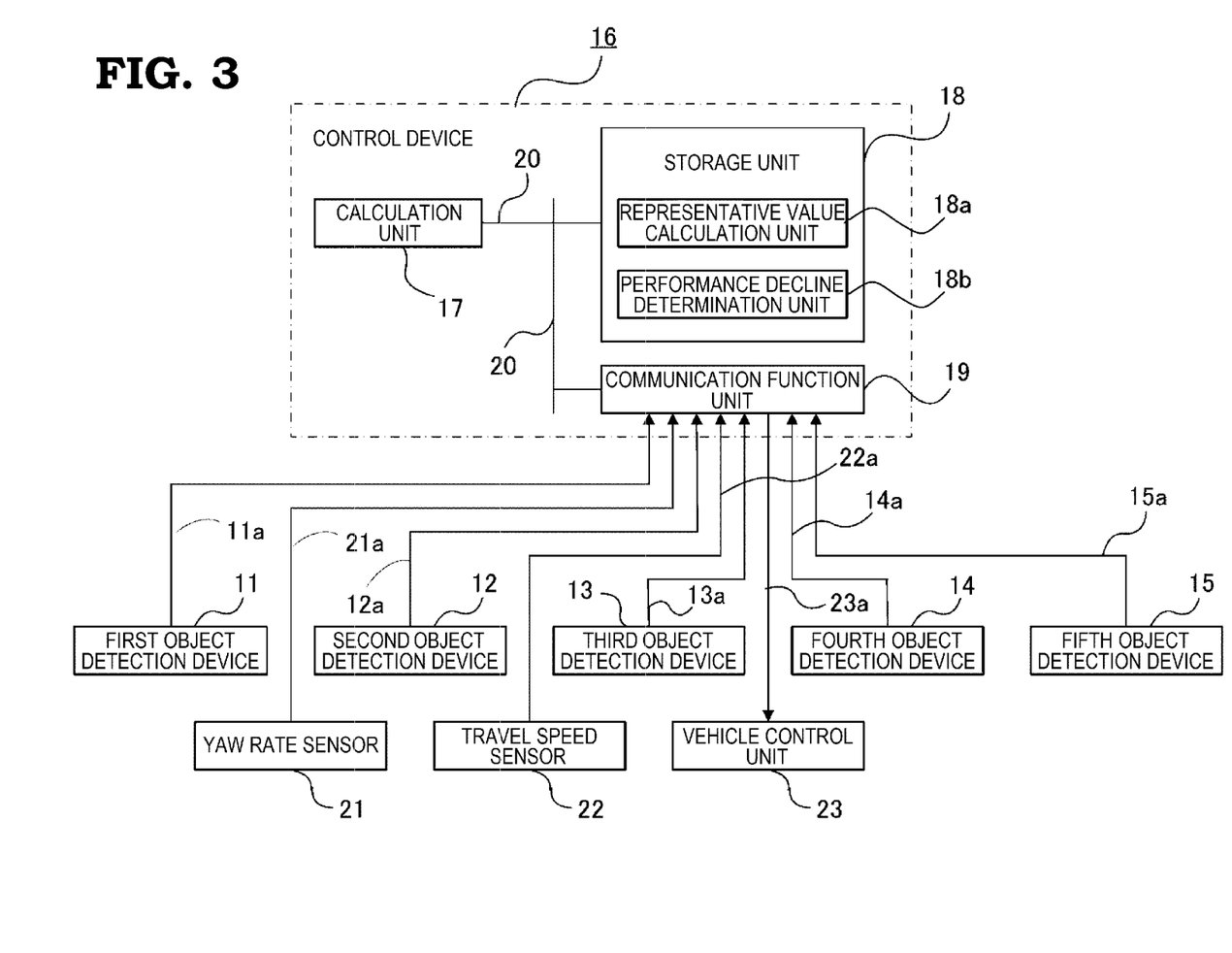
FIG. 3 is a functional block drawing of the object detection system according to the first embodiment.

FIG. 3 is a functional block drawing of the object detection system according to the first embodiment. The control device 16, as previously described, is configured as shown in the hardware example in FIG. 2, and includes a calculation unit 17, a storage unit 18, a communication function unit 19, and a bus 20 that connects these units, as shown in FIG. 3. The storage unit 18 is configured of a RAM (random access memory) or a ROM (read-only memory), and is configured to include a representative value calculation unit 18a, which calculates a representative value of signal strengths obtained by detecting an arbitrary peripheral object group at regular intervals from each of the first object detection device 11, the second object detection device 12, the third object detection device 13, the fourth object detection device 14, and the fifth object detection device 15, and a performance decline determination unit 18b, which determines an object detection device in which a performance decline is occurring.

The first object detection device 11, the second object detection device 12, the third object detection device 13, the fourth object detection device 14, and the fifth object detection device 15 are connected to the communication function unit 19 via signal lines 11a, 12a, 13a, 14a, and 15a, in addition to which a yaw rate sensor 21, a travel speed sensor 22, and a vehicle control unit 23 are connected to the communication function unit 19 via signal lines 21a, 22a, and 23a respectively. Information detected by each of the first object detection device 11, the second object detection device 12, the third object detection device 13, the fourth object detection device 14, the fifth object detection device 15, the yaw rate sensor 21, and the travel speed sensor 22 is input into the communication function unit 19, and a drive control signal is output to the vehicle control unit 23 from the communication function unit 19.

Assuming here millimeter-wave radar, the first object detection device 11, the second object detection device 12, the third object detection device 13, the fourth object detection device 14, and the fifth object detection device 15 detect a position of and a distance to a target object by emitting a millimeter wave and receiving a wave reflected by the target object, but LIDAR (light detection and ranging), an ultrasonic sensor, or the like may be used instead of millimeter-wave radar, provided that the sensor can detect a target object.

The yaw rate sensor 21 is a sensor that detects a vehicle rotational speed, and may be substituted with a steering wheel angle sensor or the like as other means. Also, the travel speed sensor 22, being a sensor that detects a travel speed of an own vehicle, is a sensor that detects, for example, a rotational speed of a wheel. Although not shown in FIG. 3, the control device 16 may have a function of executing a so-called sensor fusion process, combining a distance to a target object, a relative speed, and an angle of each of the first object detection device 11, the second object detection device 12, the third object detection device 13, the fourth object detection device 14, and the fifth object detection device 15, and combining with another sensing result, such as that of a monocular camera, a stereo camera, LIDAR, or an ultrasonic sensor.

Also, the first object detection device 11, the second object detection device 12, the third object detection device 13, the fourth object detection device 14, and the fifth object detection device 15 acquire reflected wave reception strength data. Also, when comparing relatively even when device performances (antenna gain, circuit characteristics, or the like) or detection distances differ, the first object detection device 11, the second object detection device 12, the third object detection device 13, the fourth object detection device 14, and the fifth object detection device 15 acquire data normalized using normalization means to be described hereafter, for example, data relating to a radar cross-section area obtained by converting from reception strength data.

Furthermore, the first object detection device 11, the second object detection device 12, the third object detection device 13, the fourth object detection device 14, and the fifth object detection device 15 calculate a representative value of data obtained by each object detection device at regular intervals, compare the representative values, and determine that an object detection device whose value is small in comparison with that of other object detection devices is declining in performance. Although a regular interval is set as a traveling time or a traveling distance, more stable data can be acquired by setting as a traveling distance, which is not affected by a traveling speed of the own vehicle. Also, a representative value here indicates a mean value, a median value, a mode value, or the like.

As the first object detection device 11, the second object detection device 12, the third object detection device 13, the fourth object detection device 14, and the fifth object detection device 15 are not necessarily each designed in such a way as to detect the same area, target objects detected by each object detection device differ. However, by data being received at regular intervals in, for example, certain road conditions, representative values thereof become close in all the object detection devices. The reason for this is that no great difference occurs in kinds of target object detected by an object detection device in a section in which the condition of a road traveled on does not change greatly. Although reception strength data differ for each target object (a car, a motorcycle, a person, a roadside object, or the like), no great difference in reception strength data occurs when there is no great difference in kinds of target object, because of which mean values of data received at regular intervals in a section in which the condition of a road traveled on does not change greatly are identical values. A case in which road conditions change greatly is, for example, before entering and after entering a tunnel, or before entering and after entering an urban area from a mountain road.

Herein, normalization will be described. Radars used in vehicle-mounted object detection systems are not necessarily of exactly the same specifications or exactly the same installation heights. In such a case, it is desirable that reception strengths are normalized among radars using normalization means, whereby comparison can be carried out among the radars using the same indices. For example, it is known that radar reception strength is inversely proportional to distance to the power of four. As millimeter wave radar is such that distance to a target object can be detected, reception strengths among radars can be compared with the effect of distance restricted by correcting an obtained reception strength for an attenuation equivalent to the distance to the power of four.

Also, antenna gain is also a target of correction. In an object detection device, an antenna has directivity in a predetermined direction. Characteristics of the directivity are acquired in advance, and reception strength is corrected by an amount equivalent to antenna gain using an angle measurement value obtained by the object detection device, whereby reception strengths among radars can be compared with the effect of a difference in antenna gains among the radars restricted.

Further still, characteristics of hardware configuring radar are also a target of correction. For example, there is a case wherein an object detection device is such that a signal received by an antenna is input into an A/D converter via a low-pass filter, a high-pass filter, an amplifier, or the like. In such a case, reception strength is corrected with consideration to characteristics of these circuit parts, whereby reception strengths among radars can be compared with the effect of a difference in hardware characteristics among the radars restricted.

When a difference in reception strengths occurs among radars in a state wherein no performance decline, including those previously mentioned, is occurring, reception strengths among radars can be compared with the effect of a difference in reception strengths among the radars restricted provided that the difference in reception strength among radars is acquired in advance, and reception strengths among radars are compared after correcting by an amount equivalent to the difference in reception strength. Normalization of reception strength is not always essential. For example, normalization is not essential when there is no great difference in reception strength values among radars regardless of whether or not normalization is carried out, and a required determination of radar performance decline can be carried out. Also, normalization is not essential when radar specifications and attachment conditions are the same for all object detection devices.

Figure 4:
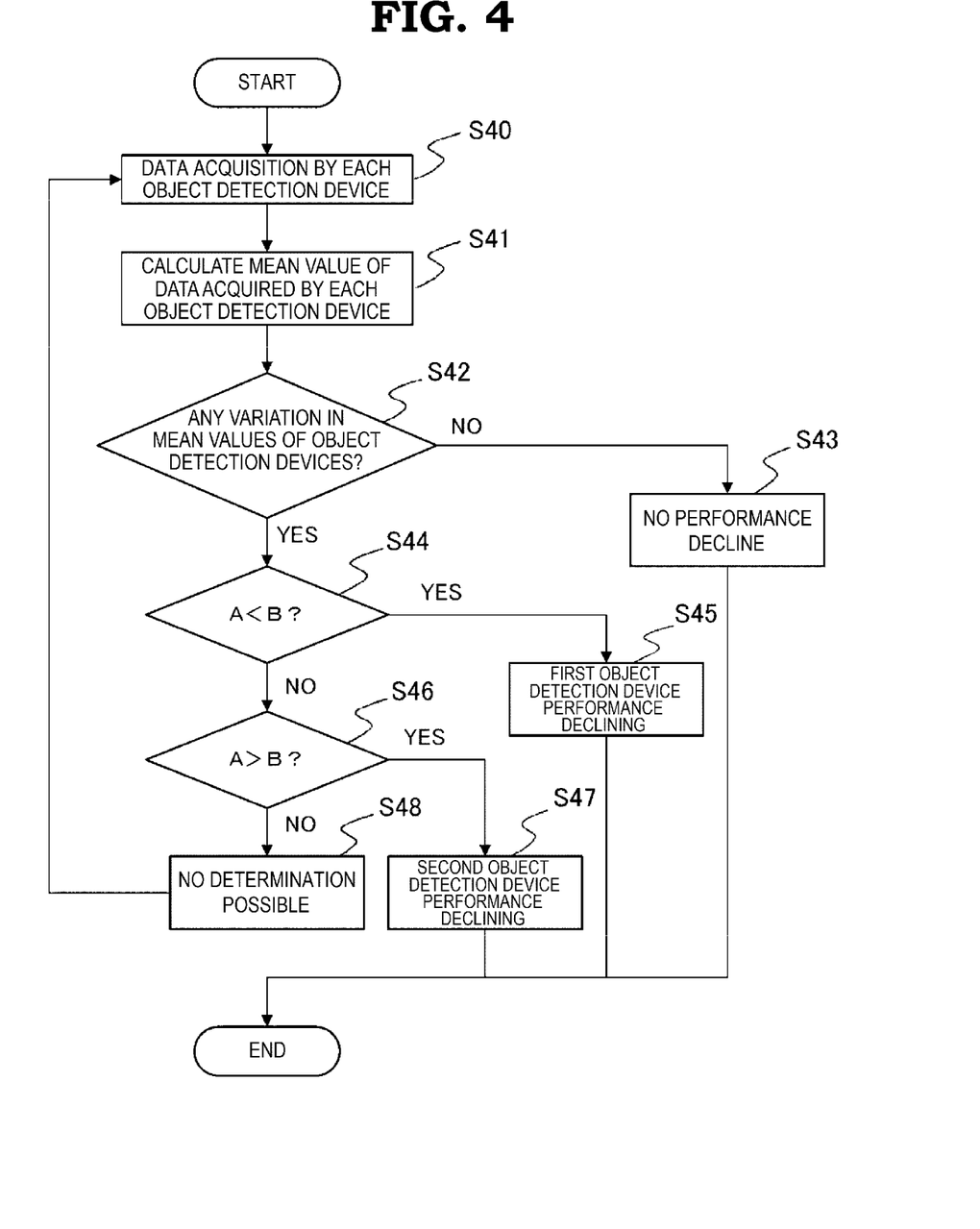
FIG. 4 is a flowchart showing a performance decline determination operation of the object detection system according to the first embodiment.

Next, an operation of the object detection system according to the heretofore described configuration will be described. FIG. 4 is a flowchart showing an operation of the performance decline determination unit 18b of the object detection system according to the first embodiment.

In FIG. 4, a description is given of a case of determining that a performance decline has occurred in a detection system formed of two object detection devices, the first object detection device 11 and the second object detection device 12, having the same radar characteristics.

Firstly, a detection process is carried out by each of the first object detection device 11 and the second object detection device 12 while traveling, thereby acquiring reception strength data relating to a wave reflected from a peripheral object (step S40).

Next, a mean value A of reception strength data of the first object detection device 11 (hereafter simply called A) and a mean value B of reception strength data of the second object detection device 12 (hereafter simply called B) at certain regular time intervals are calculated (step S41).

Next, it is determined whether there is any variation between A and B (step S42), and when there is no variation between the mean values of the two, it is determined that there is no performance decline (step S43), and the process is ended. When there is variation between the mean values of the two in step S42, A and B are compared (step S44), and when A is lower than B, it is determined that the performance of the first object detection device 11 is declining (step S45), and the process is ended.

When it is determined in step S44 that A is not lower than B, A and B are compared again (step S46), and when A is higher than B, it is determined that the performance of the second object detection device 12 is declining (step S47), and the process is ended. When A is not higher than B in step S46, it is assumed that no determination can be made (step S48), and the process returns to step S40.

As a performance decline determination cannot be carried out in a case other than those previously described, a detection process is carried out again using the first object detection device 11 and the second object detection device 12 for a certain time, and a performance decline determination is carried out. Also, when the vehicle is in a stationary state, there are cases in which deviation of a target detected by each object detection device becomes too large, and performance decline determination is difficult. Consequently, a performance decline determination is preferably carried out while the vehicle is traveling.

According to the object detection system and the object detection method according to the first embodiment, as heretofore described, a multiple of object detection devices are used, and determination that a decline in performance has occurred is carried out by comparing data obtained by each device, because of which a performance decline determination can be stably carried out even in a situation wherein a large number of erroneous performance decline determinations occur, such as a mountain road or a snowy road. Also, as data obtained by a multiple of object detection devices are compared, there is an advantage in that a performance decline determination is unlikely to be affected by the appropriateness of a threshold, and can be carried out easily.

Second Embodiment

Next, an object detection system and an object detection method according to a second embodiment will be described.

As a configuration and functions of the object detection system according to the second embodiment are the same as those in the first embodiment, a description will be omitted, and hereafter, a description will be given with reference to the drawings of the first embodiment.

Figure 5:
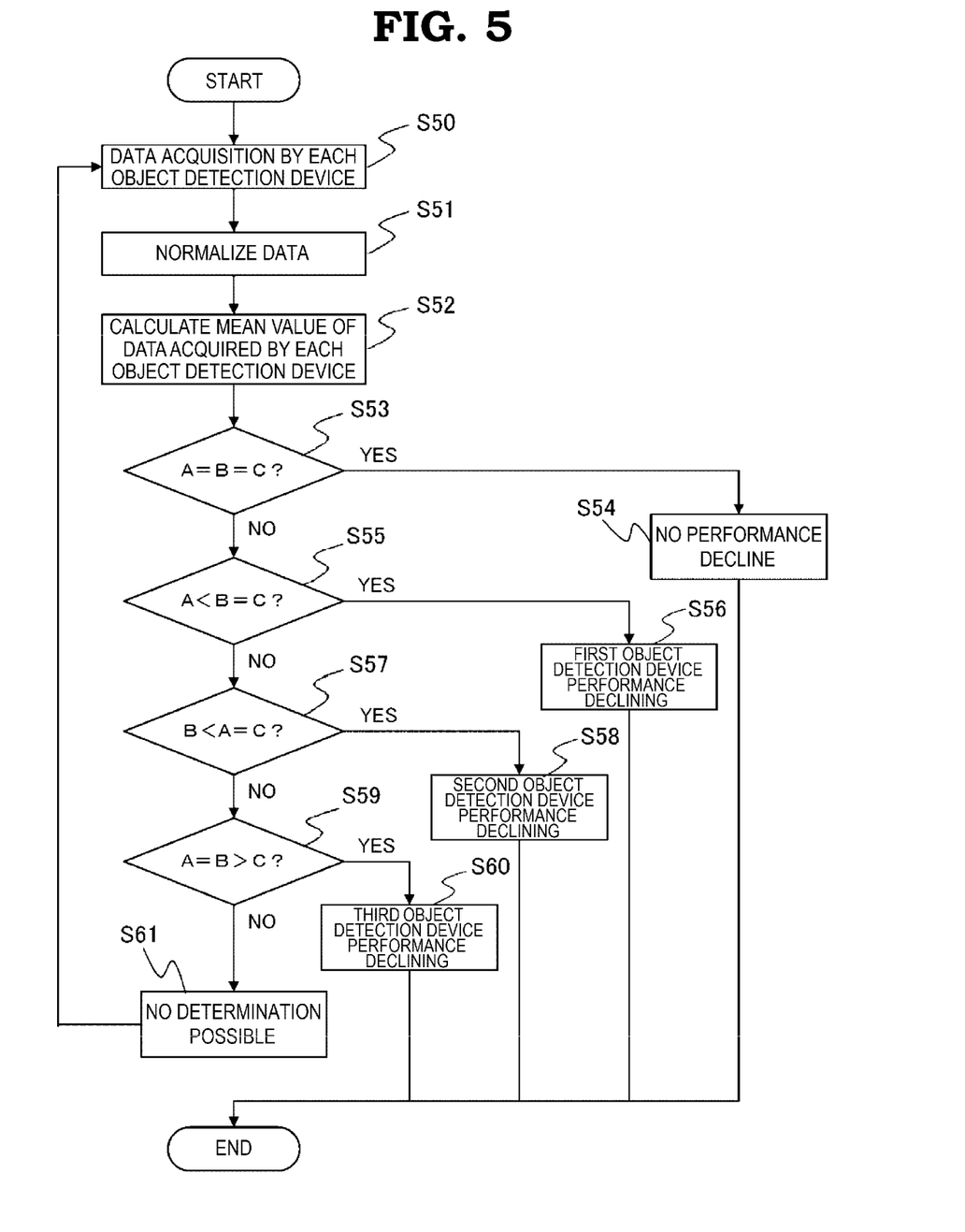
FIG. 5 is a flowchart showing a performance decline determination operation of an object detection system according to a second embodiment.

FIG. 5 is a flowchart showing a performance decline determination operation of the object detection system according to the second embodiment. In FIG. 5, a description is given of a case of determining that a performance decline has occurred in a detection system formed of three object detection devices, the first object detection device 11, the second object detection device 12, and the third object detection device 13, having differing radar characteristics.

Firstly, a detection process is carried out by each of the first object detection device 11, the second object detection device 12, and the third object detection device 13 while traveling, thereby acquiring reception strength data relating to a wave reflected from a peripheral object (step S50).

Next, the reflected wave reception strength is normalized (step S51). Herein, conversion to a radar cross-section area is carried out by calculating an estimated radar cross-section area value using radar cross-section area estimating means. This is because although reflected wave reception strengths differ depending on distance from a target object or radar characteristics (antenna performance or hardware characteristics), reception strength can be evaluated without taking distance or radar characteristics into consideration by converting reception strength into radar cross-section area. Step S51 is normalization means.

Next, a mean value A of a radar cross-section area of the first object detection device 11 (hereafter simply called A), a mean value B of a radar cross-section area of the second object detection device 12 (hereafter simply called B), and a mean value C of a radar cross-section area of the third object detection device 13 (hereafter simply called C) at certain regular traveling distance intervals are calculated (step S52). Further, A, B, and C are compared (step S53), and when A, B, and C are equal, it is determined that there is no performance decline (step S54), and the process is ended. When there is variation in A, B, and C in step S53, it is determined whether A is lower than B, and B and C are equal (step S55).

When it is determined in step S55 that A<B=C holds true, it is determined that the performance of the first object detection device 11 is declining (step S56), and the process is ended. When it is determined in step S55 that A<B=C does not hold true, it is determined whether B is lower than A, and A and C are equal (step S57). When it is determined in step S57 that B<A=C holds true, it is determined that the performance of the second object detection device 12 is declining (step S58), and the process is ended. When it is determined in step S57 that B<A=C does not hold true, it is determined that A and B are equal, and B is higher than C (step S59).

When it is determined in step S59 that A=B>C holds true, it is determined that the performance of the third object detection device 13 is declining (step S60), and the process is ended. When it is determined in step S59 that A=B>C does not hold true, it is assumed that no determination can be made (step S61), and the process returns to step S50.

As a performance decline determination cannot be carried out in a case other than those previously described, a detection process is carried out again using the first object detection device 11, the second object detection device 12, and the third object detection device 13 for a certain time, and a performance decline determination is carried out.

As heretofore described, the object detection system and the object detection method according to the second embodiment have the same advantages as the first embodiment.

Third Embodiment

Next, an object detection system and an object detection method according to a third embodiment will be described.

As a configuration and functions of the object detection system according to the third embodiment are the same as those in the first embodiment, a description will be omitted, and hereafter, a description will be given with reference to the drawings of the first embodiment. Also, in the third embodiment, a description is given of a case of determining that a performance decline has occurred in a detection system formed of four object detection devices, the first object detection device 11, the second object detection device 12, the third object detection device 13, and the fourth object detection device 14, having differing radar characteristics.

In the case of this embodiment, combinations to be compared among the first object detection device 11, the second object detection device 12, the fourth object detection device 1314, and the fifth object detection device 1415 are object detection devices installed on the same side face of the vehicle, that is, the first object detection device 11 and the second object detection device 12, and the fourth object detection device 14 and the fifth object detection device 15. Further, an object detection device whose performance is declining is detected using the first object detection device 11 and the second object detection device 12, based on a flowchart the same as that in the first embodiment.

In the same way, an object detection device whose performance is declining is detected using the fourth object detection device 14 and the fifth object detection device 15, based on a flowchart the same as that in the first embodiment. When the vehicle is advancing or reversing, there is little difference between target objects detected by the first object detection device 11 and the second object detection device 12, because of which mean values of radar cross-section area in a certain period when no performance decline is occurring become closer values. In the same way, the fourth object detection device 14 and the fifth object detection device 15 are also such that mean values of radar cross-section area in a certain period when no performance decline is occurring become closer values.

Subsequently, whether or not a performance decline is occurring can be more accurately determined by comparing object detection devices whose mean values of radar cross-section area in a certain period become closer values. In addition, a situation appropriate for determining at an early stage that a performance decline has occurred is attained by comparing object detection devices whose mean values of radar cross-section area in a certain period when no performance decline is occurring become closer values, because of which a time needed for a performance decline determination can be comparatively short.

In each heretofore described embodiment, a description has been given assuming millimeter wave radar as an object detection device, but not being limited to this, LIDAR, an ultrasonic sensor, or the like may be used, provided that the sensor can detect a target object. Also, the performance decline determination unit 18b may be in an interior of an object detection device or may be inside the system, and detection ranges of the object detection devices may or may not have overlapping portions. Furthermore, installation positions and a quantity installed of the object detection devices are arbitrary, and combinations of object detection devices to be compared are also arbitrary.

Also, a method of comparing reception strength magnitudes of object detection devices may be a method whereby it is determined that a performance decline has occurred in one object detection device when a difference between the reception strength magnitudes is large with respect to a preset value, and it is determined that no performance decline is occurring in either when the difference is small, or may be a method whereby it is determined that a performance decline has occurred by calculating an overall mean value of the reception strengths of all installed object detection devices, and comparing the overall mean value and the reception strength of each object detection device.

Although the present application is described above in terms of various exemplifying embodiments and implementations, it should be understood that the various features, aspects, and functions described in one or more of the individual embodiments are not limited in their applicability to the particular embodiment with which they are described, but instead can be applied, alone or in various combinations, to one or more other embodiments. It is therefore understood that numerous modifications that have not been exemplified can be devised without departing from the scope of the present application. For example, at least one constituent component may be modified, added, or eliminated, and at least one of the preferred embodiments may be selected, and combined with the constituent components mentioned in another preferred embodiment.

REFERENCE SIGNS LIST 10 vehicle, 11 first object detection device, 11a signal line, 12 second object detection device, 12a signal line, 13 third object detection device, 13a signal line, 14 fourth object detection device, 14a signal line, 15 fifth object detection device, 15a signal line, 16 control device, 17 calculation unit, 18 storage unit, 18a representative value calculation unit, 18b performance decline determination unit, 19 communication function unit, 20 bus, 21 yaw rate sensor, 22 travel speed sensor, 23 vehicle control unit, P processor, M storage device.

The invention claimed is:

1. An object detection system, comprising:
a plurality of object detection devices, each object detection device of the plurality of object detection devices including a transmission system configured to transmit a transmission wave and a receiving system configured to receive a reflected wave of the transmission wave; and
a control device into which detected information from the plurality of object detection devices is input, wherein the control device comprises a processor configured to:
calculate a representative value of reception strength of the reflected wave obtained by each of the plurality of object detection devices detecting an object in a periphery at regular intervals, thereby obtaining a plurality of representative values, wherein a first representative value of the plurality of representative values is associated with a first object detection device of the plurality of object detection devices, and the plurality of representative values correspond, respectively, to a plurality of reception strengths from the plurality of object detection devices, and
determine, based the first representative value, that a decline in performance of the first object detection device has occurred.

2. The object detection system according to claim 1, wherein the processor is further configured to identify the first object detection device as one in which a performance decline is occurring by comparing magnitudes of the plurality of representative values.

3. The object detection system according to claim 2, wherein the plurality of object detection devices comprises a second plurality of object detection devices installed on a same side face of a vehicle,
the comparing is based only on the second plurality of object detection devices.
the second plurality of object detection devices includes the first object detection device and a second object detection device, and
the comparing comprises comparing a first normalized signal strength corresponding to the first object detection device with a second normalized signal strength corresponding to the second object detection device to determine that the first object detection device has a deteriorated performance.

4. The object detection system according to claim 1, wherein the processor is further configured to normalize the plurality of reception strengths to obtain the plurality of representative values, and to compare the plurality of representative values.

5. The object detection system according to claim 4, wherein the processor is further configured to normalize by correcting a change in a reception strength caused by distance.

6. The object detection system according to claim 5, wherein the processor is further configured to normalize by calculating an estimated radar cross-section area value using a radar cross-section area estimating circuitry.

7. The object detection system according to claim 4, wherein the processor is further configured to normalize by correcting a change in reception strength caused by hardware characteristics of each of the plurality of object detection devices.

8. The object detection system according to claim 4, wherein the processor is further configured to normalize by correcting a change in reception strength caused by an antenna gain of each of the plurality of object detection devices.

9. The object detection system according to claim 8, wherein the processor is further configured to normalize by calculating an estimated radar cross-section area value using a radar cross-section area estimating circuitry.

10. The object detection system according to claim 7, wherein the processor is configured to normalize by calculating an estimated radar cross-section area value using a radar cross-section area estimating circuitry.

11. The object detection system according to claim 4, wherein the processor is further configured to normalize by calculating an estimated radar cross-section area value using a radar cross-section area estimating circuitry.

12. The object detection system according to claim 4, wherein the plurality of object detection devices comprises a second plurality of object detection devices installed on a same side face of a vehicle,
the comparing is based only on the second plurality of object detection devices,
the second plurality of object detection devices includes the first object detection device and a second object detection device, and
the comparing comprises comparing a first normalized signal strength corresponding to the first object detection device with a second normalized signal strength corresponding to the second object detection device to determine that the first object detection device has a deteriorated performance.

13. The object detection system according to claim 1, wherein the processor is further configured to identify the first object detection device as one in which a performance decline is occurring by comparing magnitudes of the plurality of representative values,
the plurality of object detection devices comprises a second plurality of object detection devices installed on a same side face of a vehicle,
the comparing is based only on the second plurality of object detection devices,
the second plurality of object detection devices includes the first object detection device and a second object detection device, and
the comparing comprises comparing a first normalized signal strength corresponding to the first object detection device with a second normalized signal strength corresponding to the second object detection device to determine that the first object detection device has a deteriorated performance.

14. A method comprising:
transmitting by each of a plurality of object detection devices a respective transmission wave;
receiving by each of plurality of object detection devices a respective reflected wave from of the transmission wave detects an object in a periphery at regular intervals;
calculating a representative value of reception strength of the reflected wave obtained by detecting the object, thereby obtaining a plurality of representative values, wherein a first representative value of the plurality of representative values is associated with a first object detection device of the plurality of object detection devices, and the plurality of representative values correspond, respectively, to a plurality of reception strengths from the plurality of object detection devices; and determining, based the first representative value, a decline in performance of the first object detection device.

15. The method according to claim 14, wherein the plurality of object detection devices is mounted in a vehicle, and the determining is performed while the vehicle is traveling.

16. The method according to claim 14, further comprising:

normalizing the plurality of reception strengths to obtain the plurality of representative values; and comparing the plurality of representative values.

17. The method according to claim 16, wherein the normalizing comprises correcting a change in reception strength caused by distance.

18. The method according to claim 16, wherein the normalizing comprises correcting a change in reception strength caused by an antenna gain of each of the multiple plurality of object detection devices.

19. The method according to claim 16, wherein the normalizing comprises correcting a change in reception strength caused by hardware characteristics of each of the multiple-plurality of object detection devices.

20. The method according to claim 16, wherein the normalizing comprises correcting a change in reception strength caused by hardware characteristics of each of the plurality of object detection devices.

* * * * *